United States Patent
Choi et al.

(10) Patent No.: US 9,596,097 B2
(45) Date of Patent: Mar. 14, 2017

(54) APPARATUS AND METHOD FOR TRANSFERRING NETWORK ACCESS INFORMATION OF SMART HOUSEHOLD APPLIANCES

(71) Applicant: ELECTRONICS AND TELECOMMUNICATIONS RESEARCH INSTITUTE, Daejeon (KR)

(72) Inventors: Jaeduck Choi, Daejeon (KR); Sungho Kim, Daejeon (KR); Sinkyu Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 241 days.

(21) Appl. No.: 14/474,223

(22) Filed: Sep. 1, 2014

(65) Prior Publication Data
US 2015/0312230 A1    Oct. 29, 2015

(30) Foreign Application Priority Data
Apr. 25, 2014    (KR) .................. 10-2014-0049951

(51) Int. Cl.
H04L 9/32    (2006.01)
H04L 12/28    (2006.01)
H04L 29/12    (2006.01)

(52) U.S. Cl.
CPC ...... *H04L 12/2803* (2013.01); *H04L 12/2898* (2013.01); *H04L 61/2076* (2013.01);
(Continued)

(58) Field of Classification Search
CPC ............. H04L 12/2803; H04L 12/2898; H04L 61/2076; H04L 61/2517; H04L 61/2575; H04L 61/2015; H04L 61/2514
See application file for complete search history.

(56) References Cited

U.S. PATENT DOCUMENTS 7,797,411 B1 * 9/2010 Guruswamy ......... G06F 15/173
                                                    709/223
7,808,961 B2 * 10/2010 Ishii ...................... H04W 40/20
                                                    370/218
(Continued)

FOREIGN PATENT DOCUMENTS

KR    10-2010-0035083 A    4/2010
KR    10-2012-0113078 A    10/2012
KR    10-2013-0073464 A    7/2013

*Primary Examiner* — Fatoumata Traore
*Assistant Examiner* — Khoi Le
(74) *Attorney, Agent, or Firm* — LRK Patent Law Firm

(57) ABSTRACT

An apparatus and method for transferring network access information of smart household appliances are provided. The apparatus includes a detection unit for detecting whether a public IP address of an external interface of an indoor IP sharer has changed. An extraction unit is configured to, if the public IP address of the external interface has changed, extract network access information of a smart household appliance connected to an internal interface of the indoor IP sharer, the network access information being updated together with change in the public IP address. An encryption and generation unit encrypts the network access information using a pre-stored encryption key, and generates data to be transmitted to a smart grid service provider server using the encrypted information and an ID of a customer user. A transmission unit transmits the data generated by the encryption and generation unit to the smart grid service provider server.

11 Claims, 6 Drawing Sheets

(52) U.S. Cl.
CPC ...... *H04L 61/2575* (2013.01); *H04L 61/2015* (2013.01); *H04L 61/2514* (2013.01); *H04L 61/2517* (2013.01)

(56) References Cited

U.S. PATENT DOCUMENTS

| | | | |
|---|---|---|---|
| 8,090,830 B2 * | 1/2012 | Buckley | H04L 61/3085 709/226 |
| 2002/0102999 A1 * | 8/2002 | Maggenti | H04L 12/1822 455/518 |
| 2004/0148406 A1 * | 7/2004 | Shima | H04L 29/06 709/228 |
| 2008/0196098 A1 * | 8/2008 | Cottrell | H04L 63/0414 726/12 |
| 2009/0019523 A1 * | 1/2009 | Takahashi | H04L 63/105 726/3 |
| 2009/0204807 A1 * | 8/2009 | Bolin | H04L 63/0428 713/155 |
| 2010/0138551 A1 * | 6/2010 | Degaonkar | H04L 29/12066 709/228 |
| 2010/0151816 A1 * | 6/2010 | Besehanic | G06Q 30/02 455/405 |
| 2011/0093587 A1 * | 4/2011 | Toshima | G06F 21/629 709/224 |
| 2011/0178651 A1 * | 7/2011 | Choi | G01D 4/002 700/295 |

* cited by examiner

APPARATUS AND METHOD FOR TRANSFERRING NETWORK ACCESS INFORMATION OF SMART HOUSEHOLD APPLIANCES

CROSS REFERENCE TO RELATED APPLICATION

This application claims the benefit of Korean Patent Application No. 10-2014-0049951, filed Apr. 25, 2014, which is hereby incorporated by reference in its entirety into this application.

BACKGROUND OF THE INVENTION

1. Technical Field

The present invention relates generally to an apparatus and method for transferring network access information of smart household appliances and, more particularly, to an apparatus and method that transmit the network access information of smart household appliances to a smart mobile terminal (e.g., a smart phone) without externally storing and leaking the network access information when performing a service for monitoring and controlling the power consumption of indoor smart household appliances (a washing machine, a refrigerator, etc. supporting communication, control, and monitoring functions) from a remote place using the smart mobile terminal.

2. Description of the Related Art

Smart grid services for monitoring the power consumption of smart household appliances in a smart grid environment and controlling the operations of the smart household appliances have been implemented.

Customer users may use the service for monitoring and controlling the power consumption of indoor smart household appliances over the Internet even in an outdoor area, by using a smart mobile terminal such as a smart phone via servers provided by smart grid service providers.

That is, the server of a smart grid service provider functions to relay a service between the smart mobile terminal of a customer user and indoor smart household appliances. For this, the server of the smart grid service provider must previously detect pieces of network access information of smart household appliances.

Currently, upon implementing a service for monitoring and controlling the power consumption of current smart household appliances, the smart household appliances are configured to be capable of communicating with smart grid service providers through IP sharers in an indoor area. Here, the indoor IP sharers have the structure of being periodically allocated public Internet Protocol (IP) addresses enabling access to the Internet from an Internet Service Provider (ISP) using an IP address dynamic allocation (Dynamic Host Configuration Protocol: DHCP) technique. That is, since this is a structure in which a network address enabling access to an indoor smart household appliance is frequently changed by the DHCP, the server of a smart grid service provider or a smart mobile terminal must be able to detect the changed network address in an outdoor area. In this structure, for communication between the smart grid service provider and the indoor smart household appliances, an IP sharer or a smart household appliance must periodically transfer network access information of the smart household appliance to the server of the smart grid service provider. Alternatively, the smart household appliance must primarily initiate communication using the preset address of the smart grid service provider server. That is, the smart mobile terminal of a customer user in an outdoor area can access the smart household appliance via the server and use related services only when the smart grid service provider server can know the network access information of the smart household appliance, which is frequently changed by the DHCP, using any method.

However, as an interest in the protection of personal information has increased, there is worry about an invasion of an individual's privacy for the service of monitoring and controlling the power consumption of indoor smart household appliances. For example, the network access information of an indoor smart household appliance can be misused as base data for the hacking of the smart household appliance in order for the insider of the smart grid service provider to illegally determine whether a specific customer user currently stays at home and to illegally control the smart household appliance. Further, when the smart grid service provider server is hacked by an external hacker, a large amount of network access information related to smart household appliances can be leaked and can be misused for an invasion of privacy and for criminal purposes.

Since conventional technologies are implemented such that, upon providing the above-described smart grid service, the network access information of indoor smart household appliances is stored in or open to the server of a third party, such as a smart grid service provider, the above-described security threat may occur.

As related preceding technology, Korean Patent Application Publication No. 10-2013-0073464 discloses technology in which an energy supplier directly controls functionality provided by a smart household appliance within a user's allowable range.

SUMMARY OF THE INVENTION

Accordingly, the present invention has been made keeping in mind the above problems occurring in the prior art, and an object of the present invention is to provide an apparatus and method for transferring the network access information of smart household appliances, which prevent a smart grid service provider and a third party from detecting network access information of smart household appliances, and allow the network access information of indoor smart household appliances to be checked only by the smart mobile terminal of a customer user, thus protecting customer users' privacy and preventing the occurrence of potential crimes.

In accordance with an aspect of the present invention to accomplish the above object, there is provided an apparatus for transferring network access information of smart household appliances, including a detection unit for detecting whether a public Internet Protocol (IP) address of an external interface of an indoor IP sharer has changed; an extraction unit for, if the public IP address of the external interface of the indoor IP sharer has changed, extracting network access information of a smart household appliance connected to an internal interface of the indoor IP sharer, the network access information being updated together with the change in the public IP address; an encryption and generation unit for encrypting the network access information of the smart household appliance extracted by the extraction unit using a pre-stored encryption key, and generating data to be transmitted to a smart grid service provider server using the encrypted information and an identifier (ID) of a customer user; and a transmission unit for transmitting the data generated by the encryption and generation unit to the smart grid service provider server.

The transmission unit may be configured to, when a destination address of the data generated by the encryption and generation unit is set to that of the smart grid service provider server, transmit the data using an anonymous routing technique.

The network access information of the smart household appliance may include an IP address and a port address of an external interface of the smart household appliance and an ID of the smart household appliance.

The public IP address of the external interface of the indoor IP sharer may be changed by a Dynamic Host Configuration Protocol (DHCP).

The network access information of the smart household appliance connected to the internal interface of the indoor IP sharer may be changed via Network Address Translation (NAT).

In accordance with another aspect of the present invention to accomplish the above object, there is provided an apparatus for transferring network access information of smart household appliances, including a registration detection unit for checking whether encrypted network access information of a smart household appliance is included in received data, and detecting the received data as data to be registered if the encrypted network access information of the smart household appliance is included in the received data; a storage unit for, if the data to be registered is detected by the registration detection unit, storing the encrypted network access information of the smart household appliance from the received data; a request detection unit for detecting whether the received data is data indicating that the smart mobile terminal requests network access information of a smart household appliance; a search and generation unit for, if request data has been detected by the request detection unit, searching the storage unit for encrypted network access information of a smart household appliance corresponding to the request data, and generating data that is transmittable to the smart mobile terminal, based on the encrypted network access information of the smart household appliance that has been found; and a transmission unit for transmitting the data generated by the search and generation unit to the smart mobile terminal.

The encrypted network access information of the smart household appliance may include an IP address and a port address of an external interface of the smart household appliance and an ID of the smart household appliance.

The smart mobile terminal may include a decryption unit for receiving the data from the transmission unit and decrypting the data using a pre-stored encryption key.

In accordance with a further aspect of the present invention to accomplish the above object, there is provided a method for transferring network access information of smart household appliances, including encrypting, by an indoor IP sharer, network access information of a smart household appliance using an encryption key; generating, by the indoor IP sharer, data to be transmitted to a smart grid service provider server, using the encrypted information and an ID of a user; transmitting, by the indoor IP sharer, the generated data to the smart grid service provider server; receiving and storing, by the smart grid service provider server, the user ID and the encrypted network access information of the smart household appliance; generating, by a smart mobile terminal, a message requesting the encrypted network access information of the smart household appliance, and sending, by the smart mobile terminal, the message to the smart grid service provider server; and if the message is received, generating, by the smart grid service provider server, a response message based on the encrypted network access information of the smart household appliance corresponding to the received message, and sending, by the smart grid service provider server, the response message to the smart mobile terminal.

Transmitting the generated data to the smart grid service provider server may include transmitting the data using an anonymous routing technique if a destination address of the generated data is set to that of the smart grid service provider server.

The method may further include, before encrypting the network access information of the smart household appliance using the encryption key, setting the encryption key, the user ID, and service provider server access information in the smart mobile terminal and in the indoor IP sharer.

The method may further include, after generating the response message and sending the response message to the smart mobile terminal, receiving, by the smart mobile terminal, the response message, and decrypting, by the smart mobile terminal, the encrypted network access information of the smart household appliance using the encryption key.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
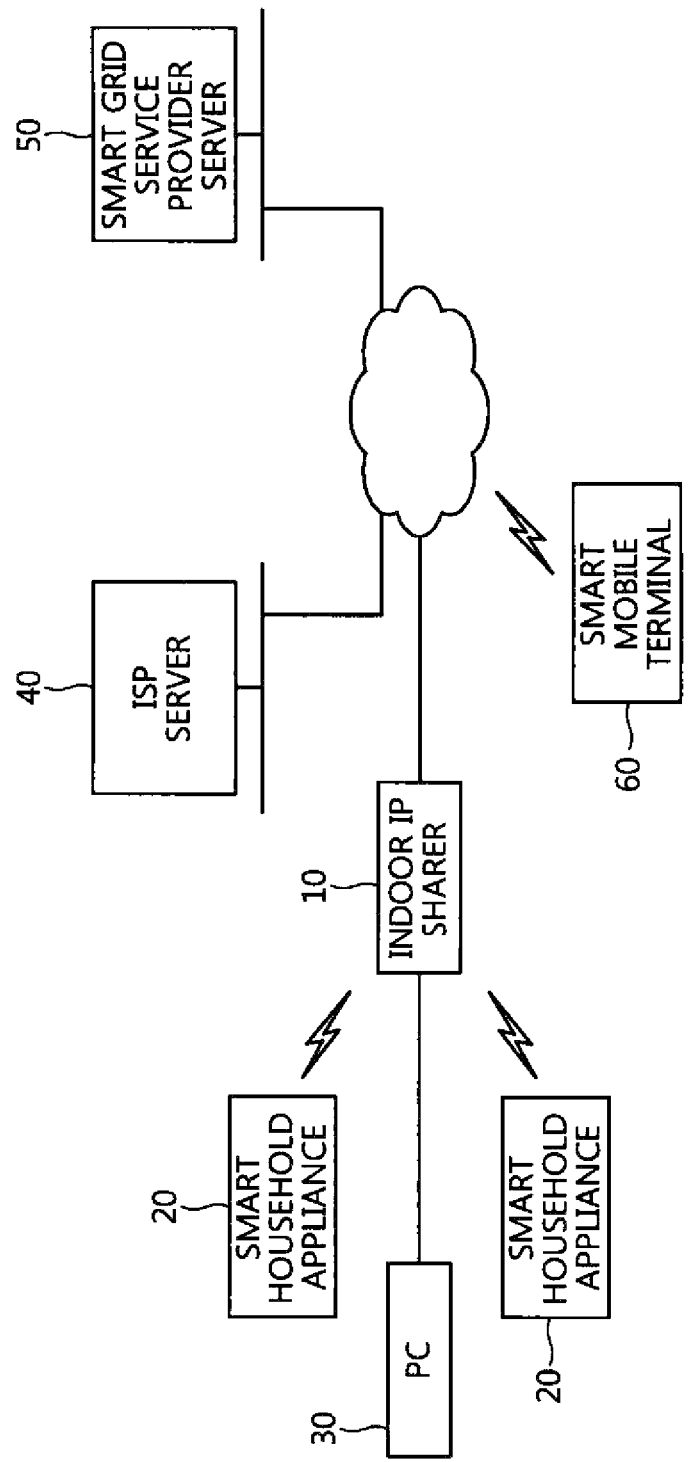
FIG. 1 is a configuration diagram showing the overall network to which the present invention is applied.

The present invention may be variously changed and may have various embodiments, and specific embodiments will be described in detail below with reference to, the attached drawings.

However, it should be understood that those embodiments are not intended to limit the present invention to specific disclosure forms and they include all changes, equivalents or modifications included in the spirit and scope of the present invention.

The terms used in the present specification are merely used to describe specific embodiments and are not intended to limit the present invention. A singular expression includes a plural expression unless a description to the contrary is specifically pointed out in context. In the present specification, it should be understood that the terms such as "include" or "have" are merely intended to indicate that features, numbers, steps, operations, components, parts, or combinations thereof are present, and are not intended to exclude a possibility that one or more other features, numbers, steps, operations, components, parts, or combinations thereof will be present or added.

Unless differently defined, all terms used here including technical or scientific terms have the same meanings as the terms generally understood by those skilled in the art to which the present invention pertains. The terms identical to those defined in generally used dictionaries should be interpreted as having meanings identical to contextual meanings of the related art, and are not interpreted as being ideal or excessively formal meanings unless they are definitely defined in the present specification.

Embodiments of the present invention will be described in detail with reference to the accompanying drawings. In the following description of the present invention, the same reference numerals are used to designate the same or similar elements throughout the drawings and repeated descriptions of the same components will be omitted.

The present invention is configured such that an indoor IP sharer encrypts network access information of an indoor smart household appliance, which is frequently changed due to the use of a DHCP, using an encryption key shared with the smart mobile terminal of a customer user, and such that the indoor IP sharer transfers the encrypted network access information to a smart grid service provider server using anonymous routing technology (The Onion Routing: Tor), thus minimizing a possibility that the network access information of indoor smart household appliances will be stored in, open to, or potentially leaked to the smart grid service provider server or a third party.

Figure 2:
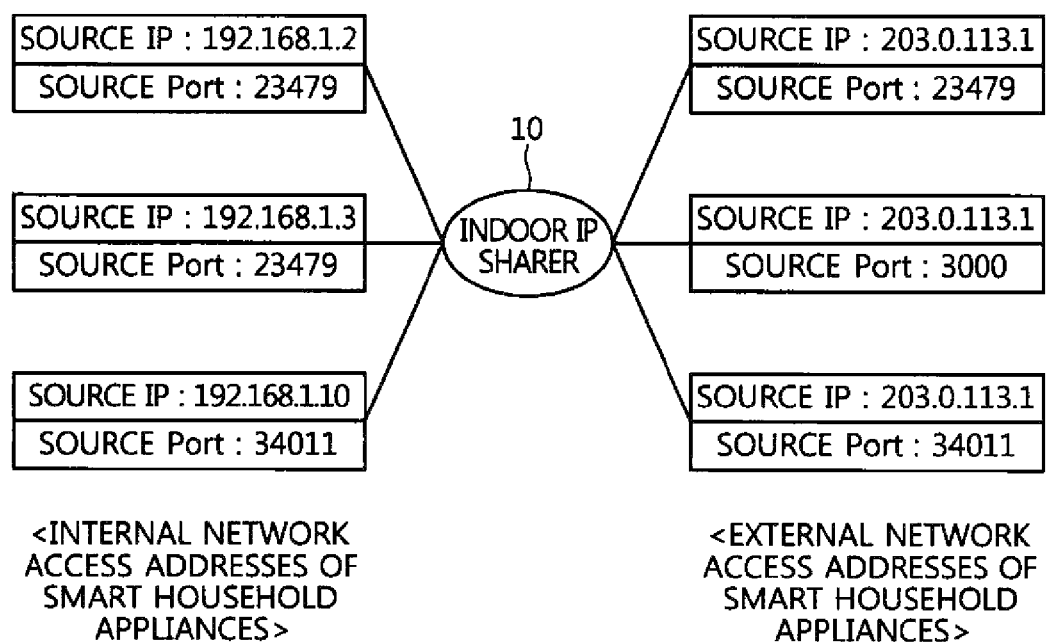
FIG. 2 is a diagram showing NAT technology used by an indoor IP sharer shown in FIG. 1.

FIG. 1 is a configuration diagram showing an overall network to which the present invention is applied, and FIG. 2 is a diagram showing Network Address Translation (NAT) technology used by an indoor IP sharer shown in FIG. 1.

An indoor IP sharer 10 is internally (that is, via an internal interface (not shown)) connected to smart household appliances 20 and a PC 30 in a wired or wireless manner. Further, the indoor IP sharer 10 is externally (that is, via an external interface (not shown)) connected to an Internet Service Provider (ISP) server 40, a smart grid service provider server 50, and a smart mobile terminal 60.

The indoor IP sharer 10 generally functions as a gateway for accessing the Internet in an indoor area using the PC 30, and also functions as a communication gateway between the smart household appliances 20 and the smart grid service provider server 50 as a communication function is combined with the smart household appliances 20 and various types of smart grid services have been implemented.

The current indoor IP sharer 10 is allocated a public IP address from an ISP using a Dynamic Host Configuration Protocol (DHCP) technique so as to access the Internet, and the allocated public IP address is periodically updated. As the public IP address of the external interface of the indoor IP sharer 10 is changed, the access addresses of the smart household appliances 20 connected to the internal interface are also changed. The reason for this is that the indoor IP sharer 10 uses well-known Network Address Translation (NAT) technology. The principle of the NAT technology is described below. In FIG. 2, in order for an outdoor system to access a smart household appliance having an IP address of 192.168.1.2:23479, the outdoor system must access an IP address of 203.0.113.1:23479. The address of data connected to the IP address of 203.0.113.1:23479 is transformed into the address of 192.168.1.2:23479 by the indoor IP sharer 10, and the transformed address is transferred to the corresponding smart household appliance 20. In this way, a table in which those addresses are defined is referred to as a 'NAT table.' The address of 203.0.113.1 is an IP address allocated to the indoor IP sharer 10 from the ISP using the DHCP, and such a public IP address is periodically changed. Therefore, when the public IP address of the indoor IP sharer 10 is changed to, for example, 203.0.113.100, the access address of the indoor smart household appliance 20 is also changed.

Figure 3:
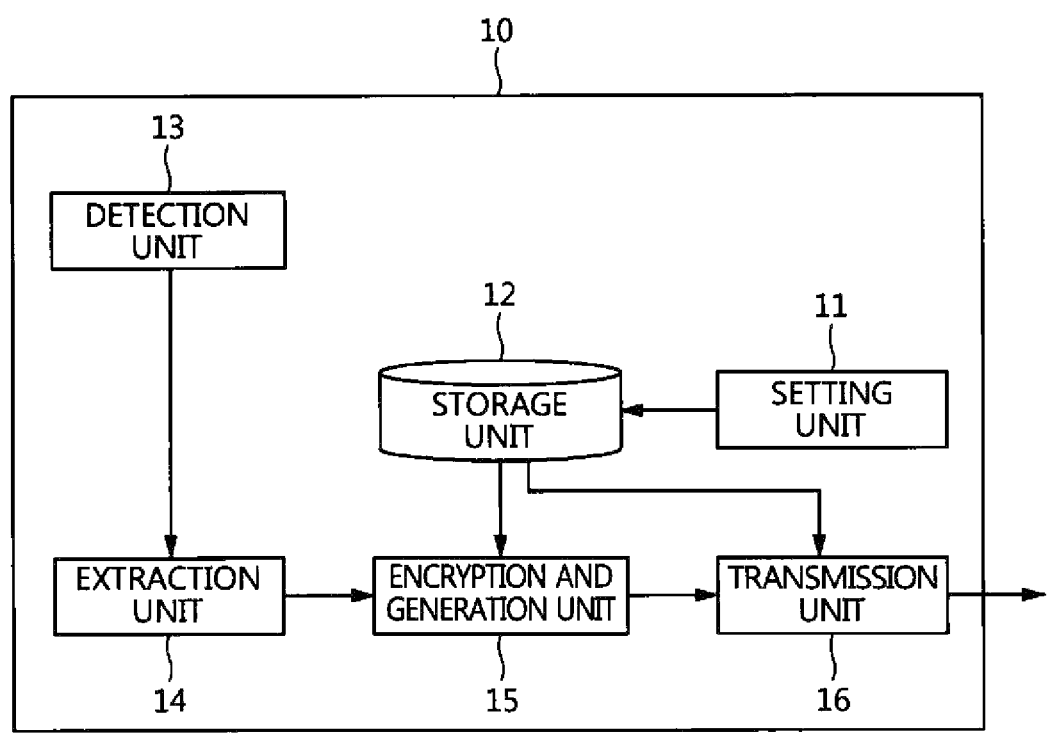
FIG. 3 is a diagram showing the internal configuration of the indoor IP sharer shown in FIG. 1.

FIG. 3 is a diagram showing the internal configuration of the indoor IP sharer shown in FIG. 1.

The indoor IP sharer 10 includes a setting unit 11, a storage unit 12, a detection unit 13, an extraction unit 14, an encryption and generation unit 15, and a transmission unit 16.

The setting unit 11 sets the ID (e.g., the ID of a customer user, the IDs of smart household appliances, etc.), an encryption key (e.g., a password), and service provider server access information. Here, the service provider server access information may include the address of a smart grid service provider server 50 which is a destination to which the encrypted network access information of smart household appliances is to be sent.

The storage unit 12 stores the ID, the encryption key, and the service provider server access information set by the setting unit 11.

The detection unit 13 detects that the public IP address of the external interface of the indoor IP sharer 10 has changed by the DHCP. If it is detected that the public IP address of the external interface of the indoor IP sharer 10 has changed by the DHCP, the detection unit 13 notifies the extraction unit 14 of the change in the IP address.

The extraction unit 14 extracts the network access information of the smart household appliances 20 (including, for example, the IP addresses and port addresses of the external interfaces of the smart household appliances 20 and the IDs of the smart household appliances 20) connected to the internal interface of the indoor IP sharer 10 that is updated together as the public IP address of the external interface of the corresponding indoor IP sharer 10 has changed, based on the results of detection by the detection unit 13 (that is, results indicating that the change in the public IP address has been detected).

The encryption and generation unit 15 encrypts the network access information of the smart household appliances extracted by the extraction unit 14 using the encryption key of the storage unit 12, and generates data to be transmitted to the smart grid service provider server 50 using the encrypted information and the ID of the customer user and the service provider server access information set by the setting unit 11.

The transmission unit 16 detects that the destination address of the data generated by the encryption and generation unit 15 is set to that of the smart grid service provider server 50, based on the information of the storage unit 12, and transmits only the data to the external interface using anonymous routing technology, that is, Tor. Tor has a structure in which the address of a source cannot be verified at the destination of data and in which data is transferred through routers equipped with the Tor function between the source and the destination. Currently, Tor software (S/W) may be downloaded over the Internet and installed on PCs, thus allowing anyone to use the Tor software. In the present invention, the Tor function and Tor S/W may be installed in and used by the indoor IP sharer 10.

Meanwhile, when the destination address of the data generated by the encryption and generation unit 15 is not set to that of the smart grid service provider server 50, the transmission unit 16 transmits the corresponding data using typical routing technology.

Figure 4:
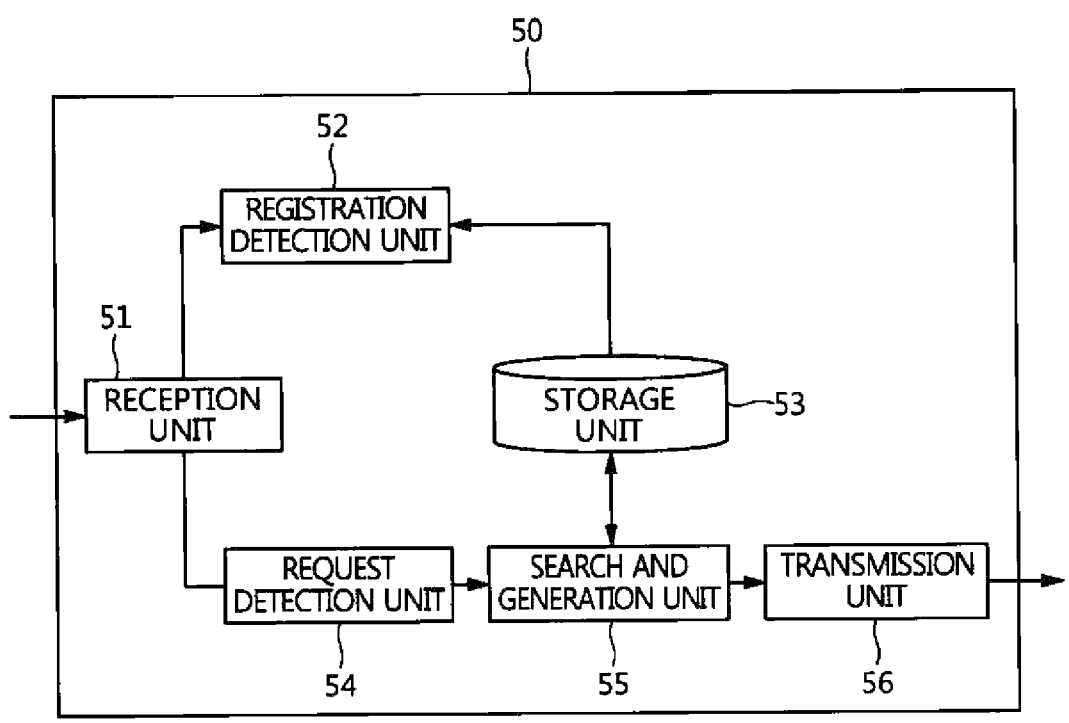
FIG. 4 is a diagram showing the internal configuration of a smart grid service provider server shown in FIG. 1.

FIG. 4 is a diagram showing the internal configuration of the smart grid service provider server shown in FIG. 1.

The smart grid service provider server 50 includes a reception unit 51, a registration detection unit 52, a storage unit 53, a request detection unit 54, a search and generation unit 55, and a transmission unit 56.

The reception unit 51 receives data transmitted from an indoor IP sharer 10 and a smart mobile terminal 60.

The registration detection unit 52 checks whether the encrypted network access information of a smart household appliance is included in the data received by the reception unit 51, and detects the corresponding received data as data to be registered if the encrypted network access information of the smart household appliance is included in the received data.

The storage unit 53 stores the ID and the encrypted network access information of the smart household appliance from the received data if the registration detection unit 52 detects the data to be registered.

The request detection unit 54 detects whether the data received by the reception unit 51 is data (e.g., the ID of a user) indicating that the smart mobile terminal 60 requests the network access information of the smart household appliance.

As the request detection unit 54 detects the request data, the search and generation unit 55 searches the storage unit 53 for the encrypted network access information of the smart household appliance corresponding to the ID of the request data, and generates data that can be transmitted to the smart mobile terminal 60, based on the encrypted network access information of the smart household appliance that has been found.

The transmission unit 56 transmits the data generated by the search and generation unit 55 to the corresponding smart mobile terminal 60.

Figure 5:
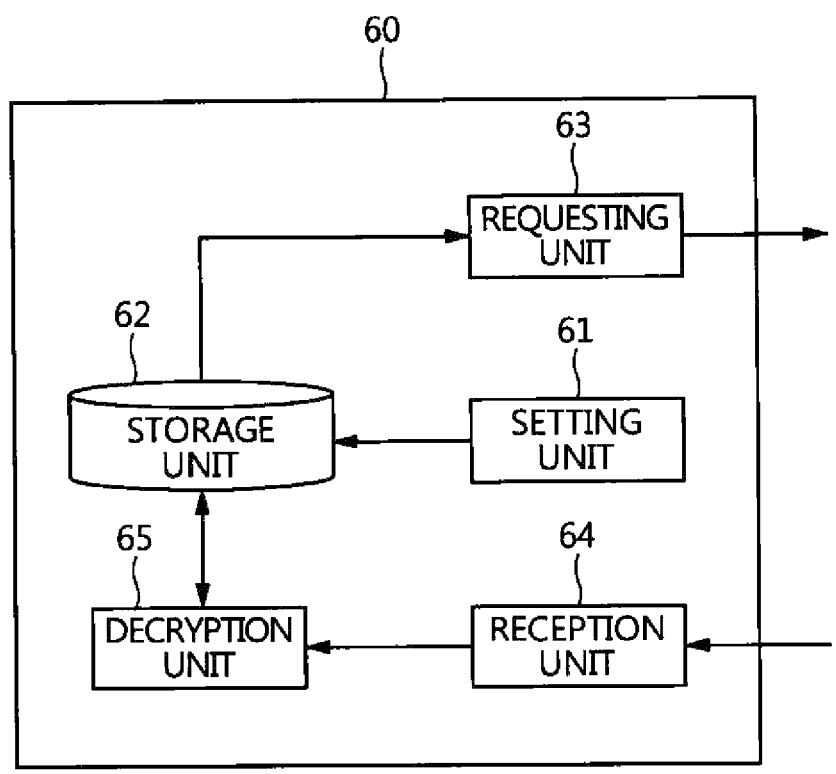
FIG. 5 is a diagram showing the internal configuration of a smart mobile terminal shown in FIG. 1.

FIG. 5 is a diagram showing the internal configuration of the smart mobile terminal shown in FIG. 1.

The smart mobile terminal 60 includes a setting unit 61, a storage unit 62, a requesting unit 63, a reception unit 64, and a decryption unit 65.

The setting unit 61 sets a user ID, an encryption key (e.g., a password), and service provider server access information.

The storage unit 62 stores the information set by the setting unit 61 (that is, the user ID, the encryption key, and the service provider server access information) and the network access information of a smart household appliance received from the smart grid service provider server 50.

The requesting unit 63 generates data requesting the encrypted network access information of the smart household appliance, based on the user ID and the service provider server access information stored in the storage unit 62, and outputs the generated data to the smart grid service provider server 50.

The reception unit 64 receives the encrypted network access information of the smart household appliance, transmitted from the smart grid service provider server 50 in response to the request of the requesting unit 63.

The decryption unit 65 decrypts the encrypted network access information of the smart household appliance, received by the reception unit 64, using the encryption key of the storage unit 62.

Figure 6:
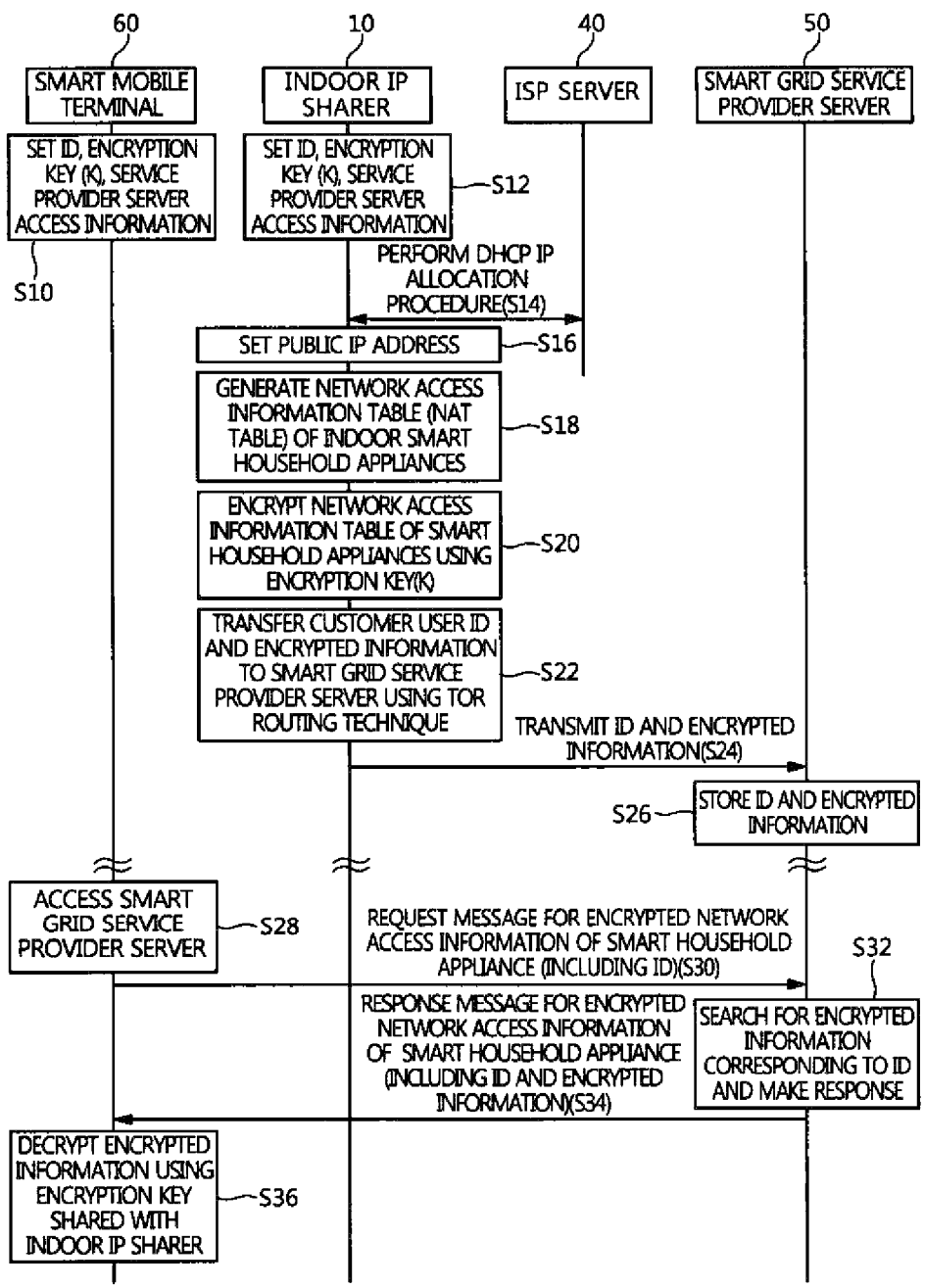
FIG. 6 is a flowchart showing a method for transferring network access information of smart household appliances according to an embodiment of the present invention.

FIG. 6 is a flowchart showing a method for transferring the network access information of smart household appliances according to an embodiment of the present invention.

First, a customer user sets a user ID, an encryption key, and access information for a smart grid service provider server in the smart mobile terminal 60 and in the indoor IP sharer 10 at steps S10, and S12.

Then, the external interface of the indoor IP sharer 10 is allocated a public IP address via the DHCP from the ISP server 40. Further, the indoor IP sharer 10 generates a NAT table for smart household appliances 20 and PCs 30, connected to the internal interface of the indoor IP sharer 10. Generally, these functions are the functions of the indoor IP sharer 10 at steps S14 to S18.

Thereafter, the indoor IP sharer 10 encrypts the network access information of each smart household appliance (e.g., the IP address and port address of the external interface, and a list of smart household appliance IDs), using the encryption key, at step S20.

The indoor IP sharer 10 transmits the ID of the customer user and the encrypted network access information of the smart household appliance to the IP address of the smart grid service provider server 50. In this case, only the data, the destination IP address of which is the service provider server, is transmitted using Tor that is anonymous routing technology at steps S22 and S24.

The smart grid service provider server 50 receives the encrypted data from the indoor IP sharer 10, and stores the encrypted data together with the ID (that is, the customer user ID) at step S26.

In this case, if the public IP address of the indoor IP sharer 10 has changed, steps S18 to S26 are repeated where the indoor IP sharer 10 encrypts the network access information of the smart household appliance and transmits the encrypted information, and where the smart grid service server stores the received information.

Thereafter, when the customer user desires to access the corresponding indoor smart household appliance, the smart mobile terminal 60 of the customer user transfers a message, requesting the encrypted network access information of the smart household appliance and including the user ID, to the smart grid service provider server 50 at steps S28 and S30.

Accordingly, the smart grid service provider server 50 receives the message requesting the encrypted network access information of the smart household appliance, searches for the encrypted network access information of the smart household appliance corresponding to the user ID, and then sends a response message to the smart mobile terminal 60 at steps S32 and S34.

The smart mobile terminal 60 receives the encrypted network access information of the smart household appliance from the smart grid service provider server 50, decrypts the encrypted network access information using the encryption key, and accesses the indoor smart household appliance using the decrypted network access information of the smart household appliance at step S36.

In accordance with the present invention having the above configuration, there is the advantage of eliminating a possibility that the network access information of indoor smart household appliances will be stored in, open to, or potentially leaked to a smart grid service provider server and a third party.

That is, in accordance with the present invention, only a smart mobile terminal of a customer user can check the network access information of indoor smart household appliances, thus contributing to the protection of privacy of customer users and the prevention of potential crimes.

As described above, optimal embodiments of the present invention have been disclosed in the drawings and the specification. Although specific terms have been used in the present specification, these are merely intended to describe the present invention and are not intended to limit the meanings thereof or the scope of the present invention described in the accompanying claims. Therefore, those skilled in the art will appreciate that various modifications and other equivalent embodiments are possible from the embodiments. Therefore, the technical scope of the present invention should be defined by the technical spirit of the claims.

What is claimed is:

1. An apparatus for transferring network access information of smart household appliances, comprising:
   one or more units, executed by a processor, using algorithm, which when executed, causes the processor to perform the one or more units, the units comprising,
   a detection unit for detecting whether a public Internet Protocol (IP) address of an external interface of an indoor IP sharer has changed;
   in response to detection of change of the public IP address of the external interface of the indoor IP sharer, an extraction unit for extracting network access information of a smart household appliance connected to an internal interface of the indoor IP sharer via a network, the extracted network access information being updated according to the change of the public IP address;
   an encryption and generation unit for encrypting the network access information of the smart household appliance, the encrypted network access information comprising the change of the public IP address, and the network access information being extracted by the extraction unit using a pre-stored encryption key, and generating data to be transmitted to a smart grid service provider server using the encrypted information and an identifier (ID) of a customer user; and
   a transmission unit for transmitting the data generated by the encryption and generation unit to the smart grid service provider server, wherein the transmission unit is configured to, in response to detection of a destination address of the data generated by the encryption and generation unit set to the smart grid service provider server, transmit the data using an anonymous routing technique.

2. The apparatus of claim 1, wherein the network access information of the smart household appliance includes an IP address and a port address of an external interface of the smart household appliance and an identification (ID) of the smart household appliance.

3. The apparatus of claim 1, wherein the public IP address of the external interface of the indoor IP sharer is changed by a Dynamic Host Configuration Protocol (CHCP).

4. The apparatus of claim 1, wherein the network access information of the smart household appliance connected to the internal interface of the indoor IP sharer is changed via Network Address Translation (NAT).

5. An apparatus for transferring network access information of smart household appliances, comprising:
   one or more units, executed by a processor, using algorithm, which when executed, causes the processor to perform the one or more units, the units comprising,
   in response to receipt of data, a registration detection unit for checking whether encrypted network access information of a smart household appliance is included in the received data, and in response to detection of the encrypted network access information of the smart household appliance included in the data, the data being determined as data to be registered;
   in response to detection of the data determined as data to be registered, a storage unit for storing the encrypted network access information of the smart household appliance from the data;
   a request detection unit for detecting whether the data is data corresponding to a request transmitted from the smart mobile terminal, the request for requesting network access information of a smart household appliance;
   in response to detection of the request by the request detection unit, a search and generation unit for searching the storage unit for encrypted network access information of a smart household appliance corresponding to the request, and generating data that is transmittable to the smart mobile terminal, the data being generated according to the encrypted network access information of the smart household appliance that has been searched; and
   a transmission unit for transmitting the data generated by the search and generation unit to the smart mobile terminal.

6. The apparatus of claim 5, wherein the encrypted network access information of the smart household appliance includes an IP address and a port address of an external interface of the smart household appliance and an ID of the smart household appliance.

7. The apparatus of claim 5, wherein the smart mobile terminal comprises a decryption unit for receiving the data from the transmission unit and decrypting the data using a pre-stored encryption key.

8. A computer-implemented method for transferring network access information of smart household appliances, comprising:
   encrypting, by an indoor IP sharer, network access information of a smart household appliance using an encryption key, the encrypted network access information comprising change information of the public IP address;
   generating, by the indoor IP sharer, data to be transmitted to a smart grid service provider server, the generated data being generated using the encrypted network access information and an identification (ID) of a user;
   transmitting, by the indoor IP sharer, the generated data to the smart grid service provider server;
   receiving and storing, by the smart grid service provider server, the user ID and the encrypted network access information of the smart household appliance;
   generating, by a smart mobile terminal, a message requesting the encrypted network access information of the smart household appliance, and sending, by the smart mobile terminal1 the requested message to the smart grid service provider server; and
   in response to receipt of the requested message, generating, by the smart grid service provider server, a response message according to the encrypted network access information of the smart household appliance, the response message corresponding to the requested message, and
   sending, by the smart grid service provider server, the response message to the smart mobile terminal, transmitting the generated data to the smart grid service provider server comprises transmitting the data using an anonymous routing technique in response to detection of a destination address of the generated data set to the smart grid service provider server.

9. The method of claim 8, wherein the network access information of the smart household appliance includes an IP address and a port address of an external interface of the smart household appliance and an ID of the smart household appliance.

10. The method of claim 8, further comprising:
prior to encrypting the network access information of the smart household appliance using the encryption key, setting the encryption key, the user ID, and service provider server access information in the smart mobile terminal and in the indoor IP sharer.

11. The method of claim 8, further comprising:
subsequent to generating the response message and sending the response message to the smart mobile terminal, receiving, by the smart mobile terminal, the response message, and decrypting, by the smart mobile terminal, the encrypted network access information of the smart household appliance using the encryption key.

* * * * *